CHARLES SWETT.

Improvement in Method of Fastening Cotton-Bale Ties.

No. 4,896. Reissued May 7, 1872.

Witness:
J. McCool
A. Moore

Chas. G. Johnson
Attorney of Chas. Swett

UNITED STATES PATENT OFFICE.

CHARLES SWETT, OF MARTINSVILLE, MISSISSIPPI, ASSIGNOR TO CHARLES G. JOHNSEN, OF NEW ORLEANS, LOUISIANA.

IMPROVEMENT IN THE METHODS OF FASTENING COTTON-BALE TIES.

Specification forming part of Letters Patent No. 59,144, dated October 23, 1866; antedated April 23, 1866; reissue No. 4,896, dated May 7, 1872.

Specification describing an Improvement in Cotton-Bale Ties, invented by CHARLES SWETT, formerly of Vicksburg, Mississippi, but now residing in Martinsville, county of Copiah, in said State.

The invention of the said SWETT consists in a new method of securing metallic bands upon cotton-bales, in which the elasticity of the cotton becomes an active means of fastening the band.

Figure 1:
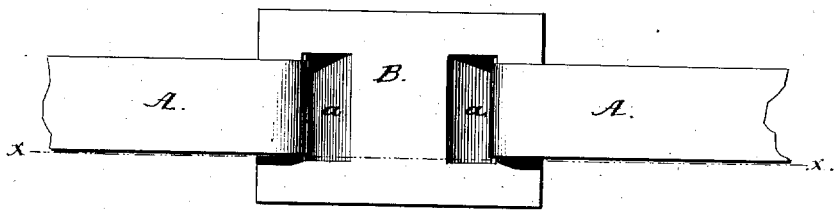
Figure 2:
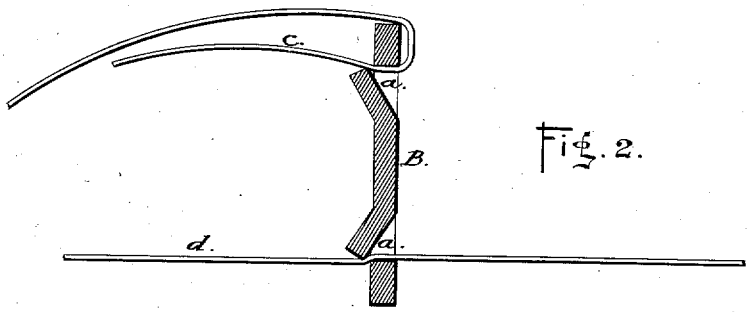
Figure 3:
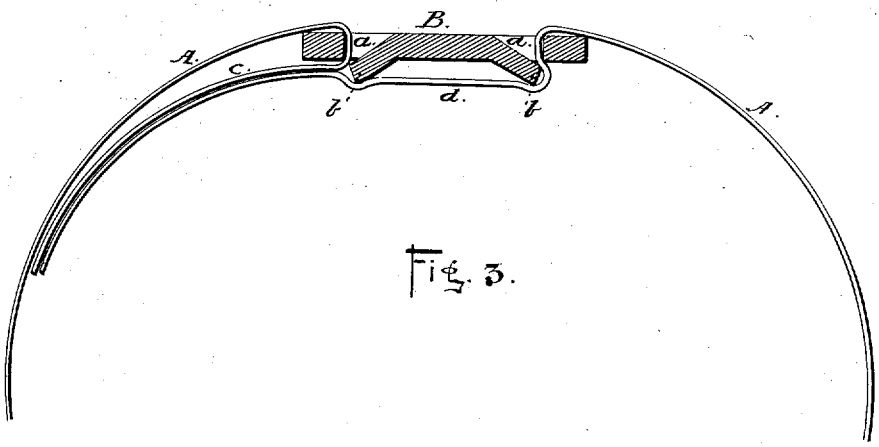

In the drawing, Figure 1 represents a plan view of a slotted link and band, and Fig. 2 represents a longitudinal section of the same as applied to a cotton-bale before the bale is allowed to expand; Fig. 3 represents the same application after the expansion of the bale has completed the fastening.

He employs a link, B, of suitable size, made by casting or stamping out of metal. In this link are formed two slots or holes, *a a*, parallel with each other across the link, the length of the slots to be equal to the width of the hoop A to be used. From the lower and inner edges of the slots projections *b b* extend out obliquely beneath said slots, nearly covering their lower openings, substantially as shown in Fig. 2. To apply the fastening one end, C, of the hoop A is passed through one slot and bent back against the hoop A. The hoop is then passed around the bale while under pressure, and its other end, *d*, put through the other slot, *a*, and drawn tight, lapping beyond the other end, C, as far as the length of the hoop will permit. Then, when the bale is relieved from pressure, the elasticity of the cotton causes it to press firmly against the ends of the hoop and prevents their being withdrawn.

What is claimed is—

1. The method of tying or fastening the free ends of metallic bands around bales of cotton and similar elastic material, by passing such free ends, while the bale is under pressure, through a slotted link or tie-plate, substantially in the manner specified, so that the inner fold or lap of the band ends will be held up and pressed firmly against the under sides or surfaces of the link or hoop by the force exerted in the expansion of the cotton when released from pressure.

2. The slotted link, in combination with the ends of metallic cotton-ties, when constructed substantially as described, to be held in position by the expansive force of the bale, substantially as described.

CHAS. G. JOHNSEN,
*Assignee of* CHARLES SWEET.

Witnesses:
SAML. S. FISHER,
CHS. M. KELLER.